United States Patent
Binfet

(10) Patent No.: US 6,880,940 B1
(45) Date of Patent: Apr. 19, 2005

(54) MAGNESIUM MIRROR BASE WITH COUNTERMEASURES FOR GALVANIC CORROSION

(75) Inventor: Michael Binfet, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/704,721

(22) Filed: Nov. 10, 2003

(51) Int. Cl.⁷ .............................. G02B 7/182; B60R 1/06
(52) U.S. Cl. ........................ 359/841; 359/872; 248/478; 248/479
(58) Field of Search ................................ 359/841, 871, 359/872, 875, 877; 248/476, 478, 479, 483, 900

(56) References Cited

U.S. PATENT DOCUMENTS

| | | | | |
|---|---|---|---|---|
| 3,751,141 A | * | 8/1973 | Brown | 359/873 |
| 4,186,905 A | * | 2/1980 | Brudy | 248/478 |
| 4,626,083 A | * | 12/1986 | Nakayama et al. | 359/841 |
| 4,692,000 A | * | 9/1987 | Wada et al. | 359/841 |
| 5,315,442 A | * | 5/1994 | Sato et al. | 359/877 |
| 5,383,057 A | * | 1/1995 | Kimura et al. | 359/841 |
| 5,384,660 A | | 1/1995 | Oishi | |
| 5,432,641 A | * | 7/1995 | Mochizuki | 359/841 |
| 5,467,222 A | * | 11/1995 | Oishi | 359/841 |
| 5,477,392 A | | 12/1995 | Mochizuki et al. | |
| 5,684,646 A | | 11/1997 | Boddy | |
| 5,703,731 A | | 12/1997 | Boddy et al. | |
| 5,703,732 A | | 12/1997 | Boddy et al. | |
| 5,721,646 A | * | 2/1998 | Catlin et al. | 359/865 |
| 5,722,629 A | * | 3/1998 | Lang et al. | 248/479 |
| 6,132,050 A | * | 10/2000 | Sakata et al. | 359/841 |
| 6,371,619 B1 | * | 4/2002 | Assinder et al. | 359/841 |
| 6,399,218 B2 | | 6/2002 | Hitomi et al. | |
| 6,449,107 B2 | | 9/2002 | Tachibe et al. | |
| 6,481,858 B2 | * | 11/2002 | Inagaki et al. | 359/841 |
| 6,533,202 B1 | | 3/2003 | Koike | |
| 2001/0015390 A1 | | 8/2001 | Hitomi et al. | |
| 2001/0022926 A1 | | 9/2001 | Kitayama et al. | |
| 2001/0030819 A1 | | 10/2001 | Hattori et al. | |

FOREIGN PATENT DOCUMENTS

JP    2000-159012    *    6/2000

* cited by examiner

Primary Examiner—Ricky D. Shafer
(74) Attorney, Agent, or Firm—Rankin, Hill, Porter & Clark LLP

(57) ABSTRACT

A folding side mirror for an automobile having a hinge structure with dissimilar metals while avoiding problems associated with galvanic corrosion. The hinge structure includes a spring and an inner base. The spring and inner base are formed from dissimilar metals, such as steel and magnesium, respectively. The spring is isolated from the inner base by a washer member, which is preferably formed from plastic.

18 Claims, 4 Drawing Sheets

MAGNESIUM MIRROR BASE WITH COUNTERMEASURES FOR GALVANIC CORROSION

FIELD OF THE INVENTION

The present invention generally pertains to a folding side mirror structure and, more particularly, toward improved folding side mirror structure that permits use of dissimilar metals.

DESCRIPTION OF RELATED ART

Assemblies including dissimilar metals, such as those having magnesium parts in combination with steel parts, suffer from galvanic corrosion. This inherent corrosion problem is exacerbated when the assembly is used in a wet environment. Due to these problems, the use of magnesium in automobiles has been rather limited, despite the weight savings and manufacturing efficiencies that could result from its implementation.

Folding automobile side mirrors are a particular application wherein galvanic corrosion resulting from the interaction of magnesium and steel has prevented the introduction of magnesium parts. For example, with reference to FIG. 6, a conventional folding automobile side mirror is shown to include an outer base 10, a housing 12, an inner base 14, a bracket 16, and a hinge structure formed between the bracket 16 and the inner base 14. The inner base 14 provides a raised cylindrical wall 14a, which serves as a pivot post. The pivot post 14a receives a plastic washer 20 and a metal push-on lock nut 22 at its upper end. The plastic washer 20 is provided to reduce noise that would otherwise be generated by contact between the metal nut 22 and a metal spring 24, described hereinafter. The bracket 16 has inner and outer concentric cylindrical walls 16a, 16b that are interconnected by a base wall 16c. The bracket's inner and outer concentric cylindrical walls 16a, 16b surround the raised cylindrical wall 14a of the inner base 14 and cooperate with the inner base cylindrical wall 14a to define an annular chamber 18 in which the biasing spring 24 is received. Thus, the biasing spring 24, which urges the folding mirror into a lower position, is trapped in the annular chamber 18 between the washer 20 and the base wall 16c of the bracket 16.

Insofar as the spring 24 is ordinarily made from steel, and due to the fact that the spring 24 is in direct contact with the bracket 16, it is not possible to form the bracket 16 from magnesium. Moreover, the upwardly open annular chamber 18 receives and holds water that may be introduced into the folding mirror assembly (e.g. from rain, condensation, etc.), which would accelerate any galvanic corrosion should a steel/magnesium junction be present. Due in part to these problems, magnesium parts have not been incorporated into folding automobile side mirrors of the design illustrated in FIG. 6.

There has also been proposed, as illustrated in FIG. 7, an alternative hinge design for folding automobile side mirrors. This proposed design also includes a bracket 40, an inner base 42, an outer base 44, and a housing 46. The bracket 40 includes inner and outer cylindrical walls 40a, 40b that are joined at their upper ends by an annular wall 40c. In this configuration, the bracket's inner cylindrical wall 40a serves as the pivot post for the hinge. Between the pivot post 40a and the outer cylindrical wall 40b, the inner base 42 provides an upwardly extending cylindrical wall 42a, with an annular flange 42b extending inwardly from an upper end thereof. The inner edge of the annular flange 42b includes a downwardly extending lip 42c, which serves to retain a spring 48 thereon, as described hereinafter.

A plastic washer 50 is placed over the lower end of the pivot post 40a, and is held in place by a lock nut 52. The spring 48 is received and retained between the washer 50 and the downwardly facing surface of the annular flange 42b. Accordingly, the spring 48, which is made of steel, is in direct contact with the inner base 42 at the annular flange 42b.

Therefore, while the problems associated with water intrusion at the hinge (i.e., in the area of the spring) are reduced or eliminated with the alternative design shown in FIG. 7, the problem of galvanic corrosion resulting from contact between steel and magnesium would still be present should the inner base 42 be made from magnesium. Thus, in the alternative design of FIG. 7 the inner base 42 has been formed from a material that is compatible with the steel spring 48, such as steel, plastic, or aluminum.

Accordingly, there exists a need in the art for an improved folding automobile side mirror that is configured so as to permit at least some of the mirror components to be formed from magnesium.

SUMMARY OF THE INVENTION

The present invention is directed toward an improved folding automobile side mirror assembly that is formed, at least partially, from magnesium. The present invention is further directed toward an improved hinge assembly for a folding automobile side mirror assembly that limits water intrusion and retention within the mirror assembly. The present invention is further directed toward such an improved hinge assembly that permits use of dissimilar metals, such as magnesium and steel, while minimizing risks associated with galvanic corrosion.

In accordance with the present invention, a folding automobile side mirror assembly, includes an outer base, an inner base, a bracket, upper and lower washer members, a lock nut, and a spring. The outer base is secured to a surface of a vehicle; the inner base and the bracket are disposed within a mirror housing that is pivotally secured to the outer base. The inner base includes an upstanding cylindrical wall that has an annular wall member extending inwardly therefrom while the bracket includes inner and outer cylindrical walls that are connected at upper ends thereof by an upper wall member.

In further accordance with the present invention, the upstanding cylindrical wall of the inner base is received between the inner and outer cylindrical wall members of the bracket. The upper and lower washer members are secured around inner cylindrical wall of the bracket and each includes a radially extending flange. The radially extending flange of the upper washer member is in engagement with the annular wall member of the inner base upstanding cylindrical wall. The lower washer member is disposed at a location spaced from the upper washer member and is held in place by the lock nut.

In further accordance with the present invention, the spring is disposed around the inner cylindrical wall and is in engagement with the radially extending flanges of the upper and lower washer members. The inner base is formed from a first metal and the spring is formed from a second metal, with the first and second metals being dissimilar and subject to galvanic corrosion. Preferably, magnesium or an alloy thereof is used as the first metal and steel is used as the second metal. The upper washer member is disposed between inner base and the spring and prevents galvanic corrosion therebetween.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
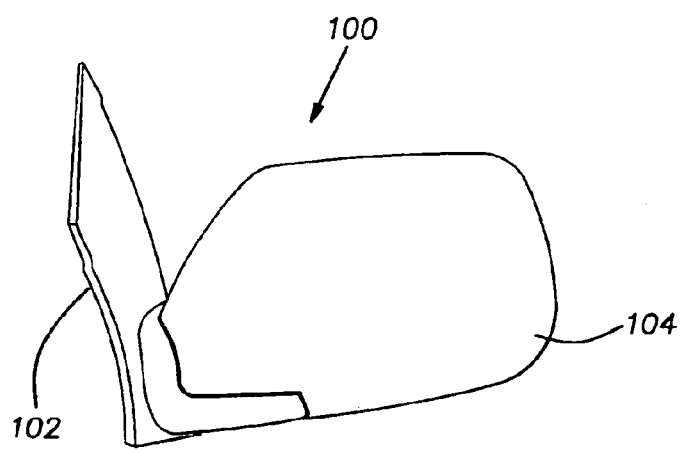
FIG. 1 is a front and top perspective view of a folding automobile mirror incorporating the present invention.
Figure 2:
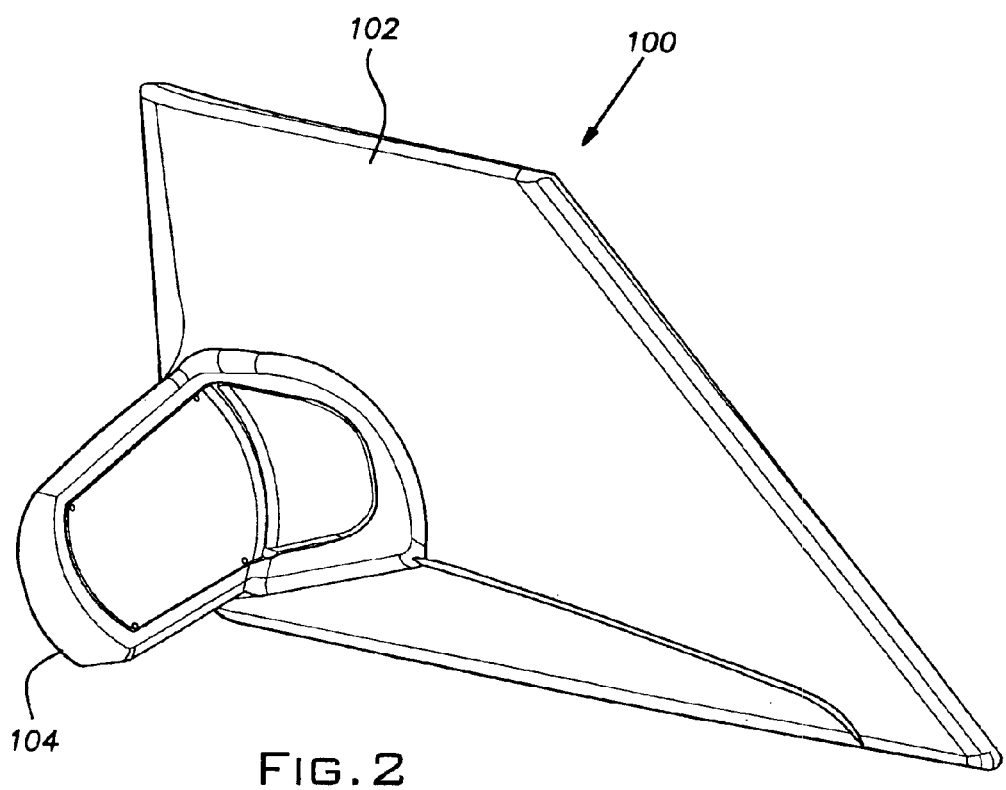
FIG. 2 is a rear and left perspective view of the folding automobile mirror shown in FIG. 1.
Figure 3:
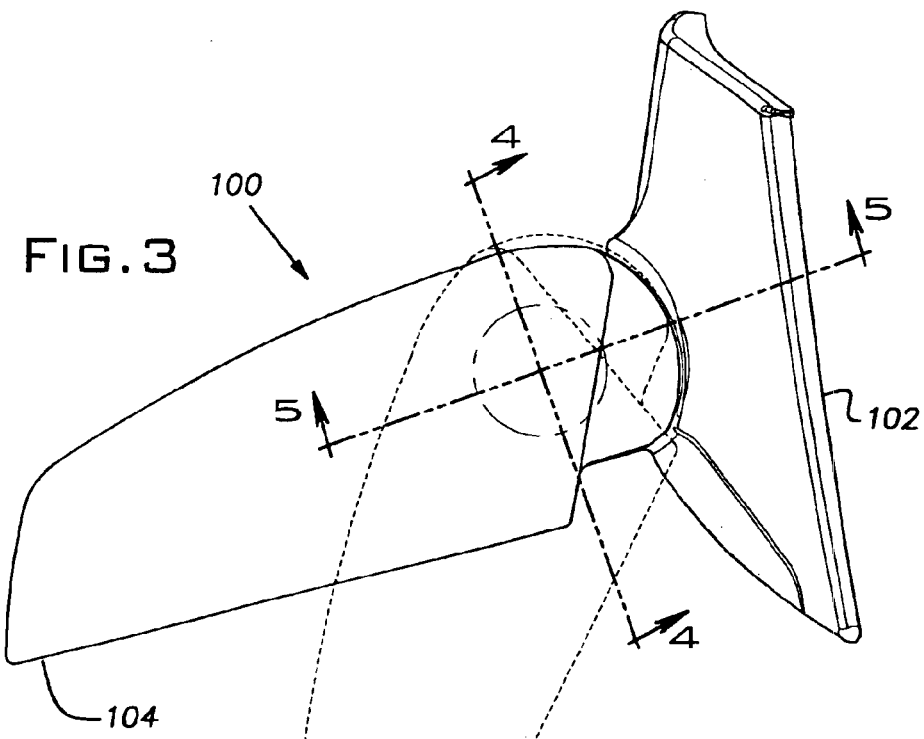
FIG. 3 is a top plan view of the folding automobile mirror of FIGS. 1–2, with the folded mirror being shown in dashed lines.

With reference to FIGS. 1–3, a folding automobile mirror assembly 100 is shown to include an outer base 102 and a mirror housing 104. The mirror housing 104 is pivotally secured to the outer base 102 such that the mirror housing 104 may be manually moved from an outwardly extended or normal position to a folded or storage position. The storage position is illustrated in dashed lines in FIG. 3. Conventionally, the mirror housing 104 will move vertically upward slightly from a normal vertical position to a raised vertical position as the mirror housing 104 pivots from the normal position toward the storage position. The mirror housing hinge assembly includes a spring that biases the mirror housing toward the normal vertical position and away from the raised vertical position so as to provide resistance to the pivoting movement. The folding automobile side mirror assembly disclosed to this point is conventional in appearance and function, and will be described hereinafter as it relates to the improved hinge structure of the present invention.

Figure 4:
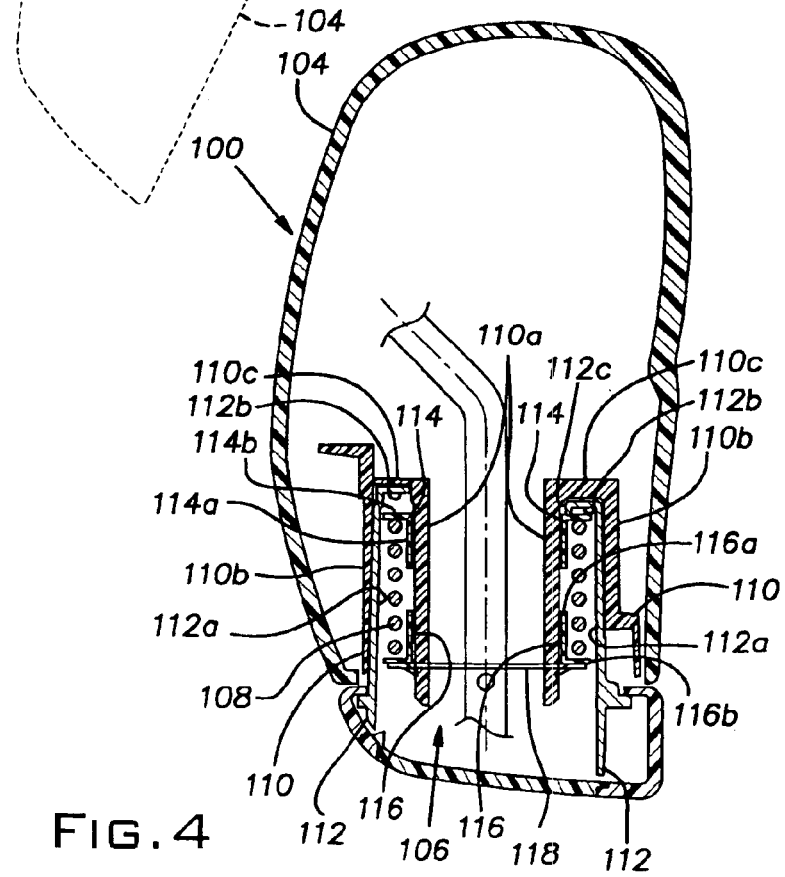
FIG. 4 is a cross sectional view of the mirror according to the present invention, as seen along line 4—4 of FIG. 3.
Figure 5:
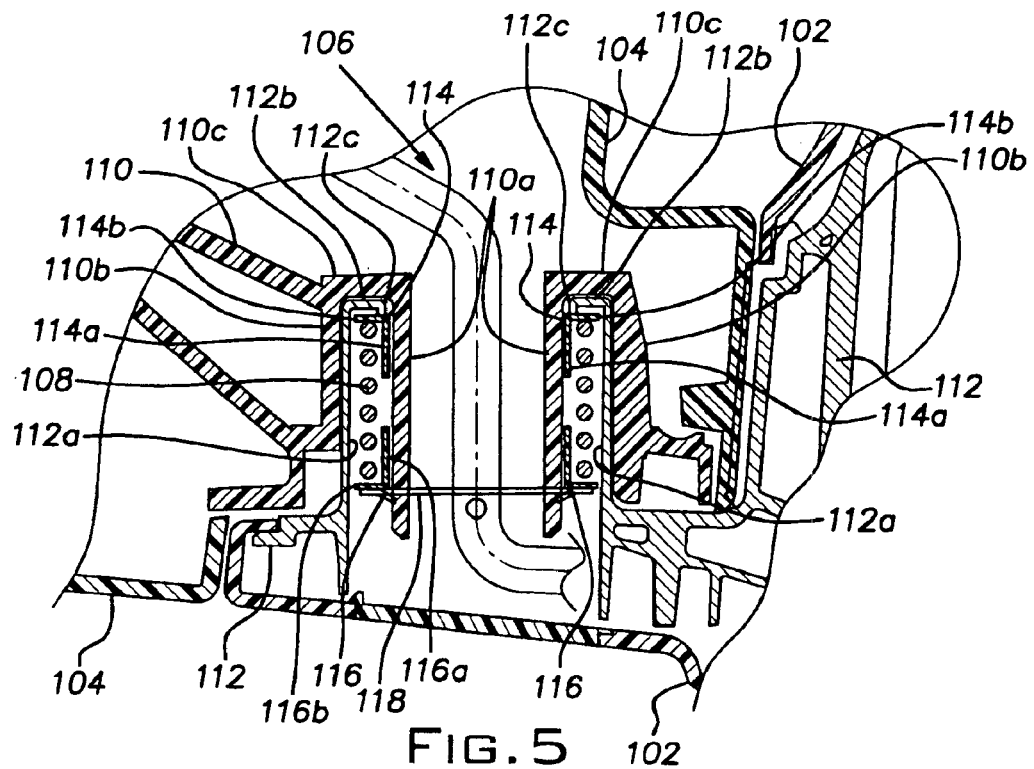
FIG. 5 is a cross sectional view of the mirror according to the present invention, as seen along line 5—5 of FIG. 3.
Figure 6:
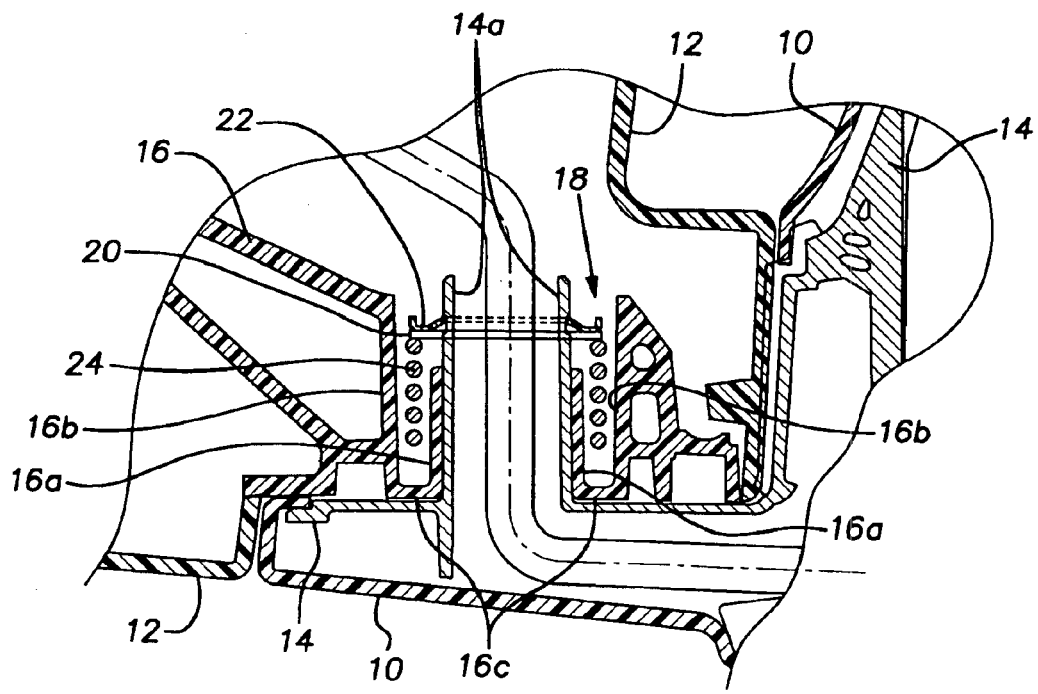
FIG. 6 is a cross sectional view of a conventional folding mirror assembly; and, FIG. 7 is a cross sectional view of another known folding mirror assembly.
Figure 7:
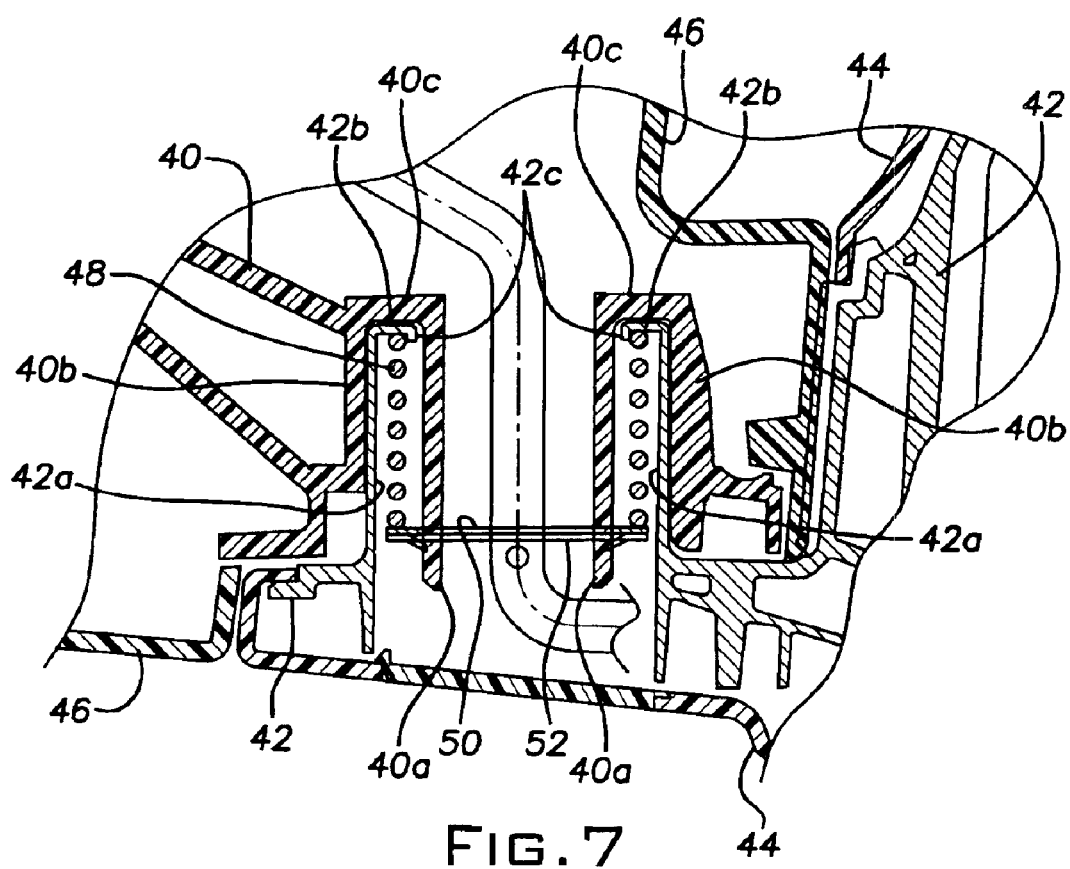

With reference to FIGS. 4 and 5, the mirror assembly 100 is shown to include a spring 108, a bracket 110, an inner base 112, an upper washer member 114, a lower washer member 116, and a lock nut 118. The spring 108 and lock nut 118 are preferably formed from steel, while the bracket 110, upper and lower washer members 114, 116, the outer base 102, and the housing 104 are formed from plastic or other materials that are not subject to galvanic corrosion. Alternatively, the housing 104 and outer base 102 may be formed from metal, such as aluminum. The inner base 112 is preferably formed from magnesium or alloys thereof and, therefore, in the illustrated embodiment must be protected from both water and contact with steel due to the threat of galvanic corrosion.

Although the present invention is particularly concerned with structures and methods to permit use of magnesium and alloys thereof in assemblies that are ordinarily used in wet environments and in the presence of other steel parts, it is more broadly concerned with structures and methods that permit the use of dissimilar metals that would otherwise be subject to galvanic corrosion. Accordingly, the present invention, although described herein with reference to the preferred embodiment (which employs a part made from magnesium used in a mirror assembly incorporating steel), is not to be limited to this specifically described and presently preferred embodiment. Rather, it is considered apparent that one skilled in the art, with knowledge of the present invention, would be capable of altering the materials used (i.e., to use another combination of dissimilar metals that would otherwise be susceptible to galvanic corrosion) without departing from the scope and spirit of the present invention.

With further reference to FIGS. 4–5, the inner base 112 and the bracket 110 cooperate with the spring 108, washer members 114, 116, and lock nut 118 to define a hinge assembly 106. To that end, the bracket 110 includes an inner cylindrical wall 110a, which defines a pivot post of the hinge assembly 106, an outer cylindrical wall 110b, and an upper wall member 110c that interconnects the upper ends of the bracket's inner and outer cylindrical walls 110a, 110b. The inner and outer cylindrical walls 110a, 110b are open at their bottom ends and spaced apart from one another to define a cylindrical chamber (annular in cross section) that receives an upstanding cylindrical wall 112a from the inner base 112. The upstanding cylindrical wall 112a is disposed adjacent an inner surface of the outer cylindrical wall 110a of the bracket 110, and includes an annular wall member 112b at its upper end that projects inwardly toward the outer surface of the bracket's inner cylindrical wall 110a. The annular wall member 112b is disposed adjacent a lower surface of the bracket's upper wall member 110c, as illustrated. An inner edge of the annular wall member 112b terminates in a downwardly extending lip 112c, which is positioned near the outer surface of the bracket's inner cylindrical wall 110a.

The upper washer member 114, which is generally L-shaped in cross section, is pushed on over the inner cylindrical wall 110a of the bracket 110 so as to have an elongated cylindrical leg 114a extending along the outer surface of the brackets inner cylindrical wall 110a and an annular rim 114b extending away from the inner cylindrical wall 110a and toward the inner surface of the inner base upstanding cylindrical wall 112a. Preferably, as best seen in FIG. 5, the downwardly extending lip 112c of the inner base 112 engages an upper surface of the upper washer member 114 at a location adjacent the intersection of the elongated cylindrical leg 114a and the annular rim 114b.

The lower washer member 116, which is pushed on over the inner cylindrical wall 110a of the bracket member 110 but retained at a location spaced downwardly from the upper washer member 114 a predetermined amount, is preferably identical to the upper washer member 114 but is inverted relative to the upper washer member 114. To that end, the lower washer member 116 has an elongated cylindrical leg 116a extending along the outer surface of the bracket's inner cylindrical wall 110a and an annular rim 116b extending away from the inner cylindrical wall 110a and toward the inner surface of the inner base upstanding cylindrical wall 112a.

The spring 108 is received between the upper and lower washer members 114, 116 and, more particularly, is in engagement with the annular rims 114b, 116b of the washer members 114, 116. The spring 108 is held in compression so as to exert a downward force on the lower washer member 116 and the bracket 110 and thereby help to retain the bracket 110 in engagement with the inner base 112.

The lock nut 118, which is pushed on over the lower end of the bracket inner cylindrical wall 110a, is downwardly adjacent and in face-to-face contact with the lower surface of the lower washer member annular rim 116b. To facilitate assembly and retention, the bracket inner cylindrical wall 110a preferably includes a circumferential groove into which an inwardly projection flange from the lock nut 118 is snap-fittingly inserted. The groove and flange cooperate to hold the lock nut 118 in place, and thereby retain the spring 108 in a compressed or biasing condition.

As noted hereinbefore, the spring 108 is preferably formed from steel, which is conventional. However, the inner base 112 is formed from magnesium. While the hinge assembly 106 is protected from water intrusion due to its closed upper end (via the bracket wall 110c), there would ordinarily still remain direct steel to magnesium contact at the flange 112b where the upper end of the spring 108 contacts the inner base 112. However, in the assembly according to the present invention, such corrosive contact is precluded by the placement of the upper washer member 114 therebetween. Accordingly, by introduction of the upper washer member 114 in this particular location, the damaging effects of galvanic corrosion are prevented and it is now possible to make the inner base 112 out of magnesium in an application in which, heretofore, the use of magnesium parts was impossible.

While the present invention has been described hereinbefore with particularity, it is considered apparent that the present invention is capable of numerous modifications, rearrangements, and substitutions of parts and, accordingly is not limited to the preferred embodiment specifically disclosed herein. Rather, the present invention is only to be defined by the claims appended hereto.

What is claimed is:

1. A folding automobile side mirror assembly, comprising:
   an outer base that is adapted to be secured to a surface of a vehicle;
   an inner base, said inner base comprising an upstanding cylindrical wall having an annular wall member extending inwardly therefrom;
   a bracket, said bracket including inner and outer cylindrical walls that are connected at upper ends thereof by an upper wall member, said upstanding cylindrical wall being received between said inner and outer cylindrical walls
   a washer member, said washer member being disposed around said inner cylindrical wall and including a radially extending flange, said radially extending flange being in engagement with said annular wall member of said inner base upstanding cylindrical wall;
   a spring disposed around said inner cylindrical wall and in engagement with said radially extending flange of said washer member;
   wherein said inner base is formed from a first metal and said spring is formed from a second metal, said first and second metals being relatively dissimilar and subject to galvanic corrosion, and wherein said washer member is disposed between said inner base and said spring and serves to isolate said inner base from said spring.

2. The mirror assembly according to claim 1, wherein said inner base is formed from magnesium and said spring is formed from steel.

3. The mirror assembly according to claim 2, wherein said washer member is made of plastic.

4. The mirror assembly according to claim 3, wherein said washer member flange is held between said spring and said inner base.

5. The mirror assembly according to claim 1, wherein said washer member is made of plastic.

6. The mirror assembly according to claim 5, wherein said washer member flange is held between said spring and said inner base.

7. The mirror assembly according to claim 1, wherein said washer member flange is held between said spring and said inner base.

8. The mirror assembly according to claim 2, wherein said washer member flange is held between said spring and said inner base.

9. A folding automobile side mirror assembly, comprising:
   an outer base that is adapted to be secured to a surface of a vehicle;
   an inner base, said inner base comprising an upstanding cylindrical wall having an annular wall member extending inwardly therefrom;
   a bracket, said bracket including inner and outer cylindrical walls that are connected at upper ends thereof by an upper wall member, said upstanding cylindrical wall being received between said inner and outer cylindrical walls
   upper and lower washer members, each of said washer members being disposed around said inner cylindrical wall and including a radially extending flange, said radially extending flange of said upper washer member being in engagement with said annular wall member of said inner base upstanding cylindrical wall, said lower washer member being disposed at a location spaced from said upper washer member;
   a lock nut secured to said inner cylindrical wall and being in engagement with said lower washer member; and,
   a spring disposed around said inner cylindrical wall and in engagement with said radially extending flanges of said upper and lower washer members;
   wherein said inner base is formed from a first metal and said spring is formed from a second metal, said first and second metals being relatively dissimilar and subject to galvanic corrosion, and wherein said upper washer member is disposed between said inner base and said spring and serves to isolate said inner base from said spring.

10. The mirror assembly according to claim 9, wherein said inner base is formed from magnesium and said spring is formed from steel.

11. The mirror assembly according to claim 10, wherein each of said upper and lower washer members is made of plastic.

12. The mirror assembly according to claim 11, wherein said upper washer member flange is held between said spring and said inner base.

13. The mirror assembly according to claim 9, wherein each of said upper and lower washer members is made of plastic.

14. The mirror assembly according to claim 13, wherein said upper washer member flange is held between said spring and said inner base.

15. The mirror assembly according to claim 9, wherein said upper washer member flange is held between said spring and said inner base.

16. The mirror assembly according to claim 10, wherein said upper washer member flange is held between said spring and said inner base.

17. A manual folding automobile side mirror hinge assembly, comprising:
   an inner base, said inner base comprising an upstanding cylindrical wall having an annular wall member extending inwardly therefrom;
   a bracket, said bracket including inner and outer cylindrical walls that are connected at upper ends thereof by an upper wall member, said upstanding cylindrical wall being received between said inner and outer cylindrical walls
   a spring disposed between said bracket inner cylindrical wall and said upstanding cylindrical wall, said spring being held on said bracket inner cylindrical wall by a lock nut, the improvement comprising:
   said inner base being formed from a first metal;
   said spring being formed from a second metal, said first and second metals being dissimilar and subject to galvanic corrosion; and,
   wherein a washer member is disposed around said inner cylindrical wall, said washer member including a radially extending flange that is interposed between said spring and said inner base so as to prevent contact between said spring and said inner base and thereby limit galvanic corrosion therebetween.

18. The mirror assembly according to claim 17, wherein said inner base is formed from magnesium and said spring is formed from steel.

* * * * *